W. A. FLANDERS.
Bee Hive.
No. 39,221. Patented July 14, 1863.
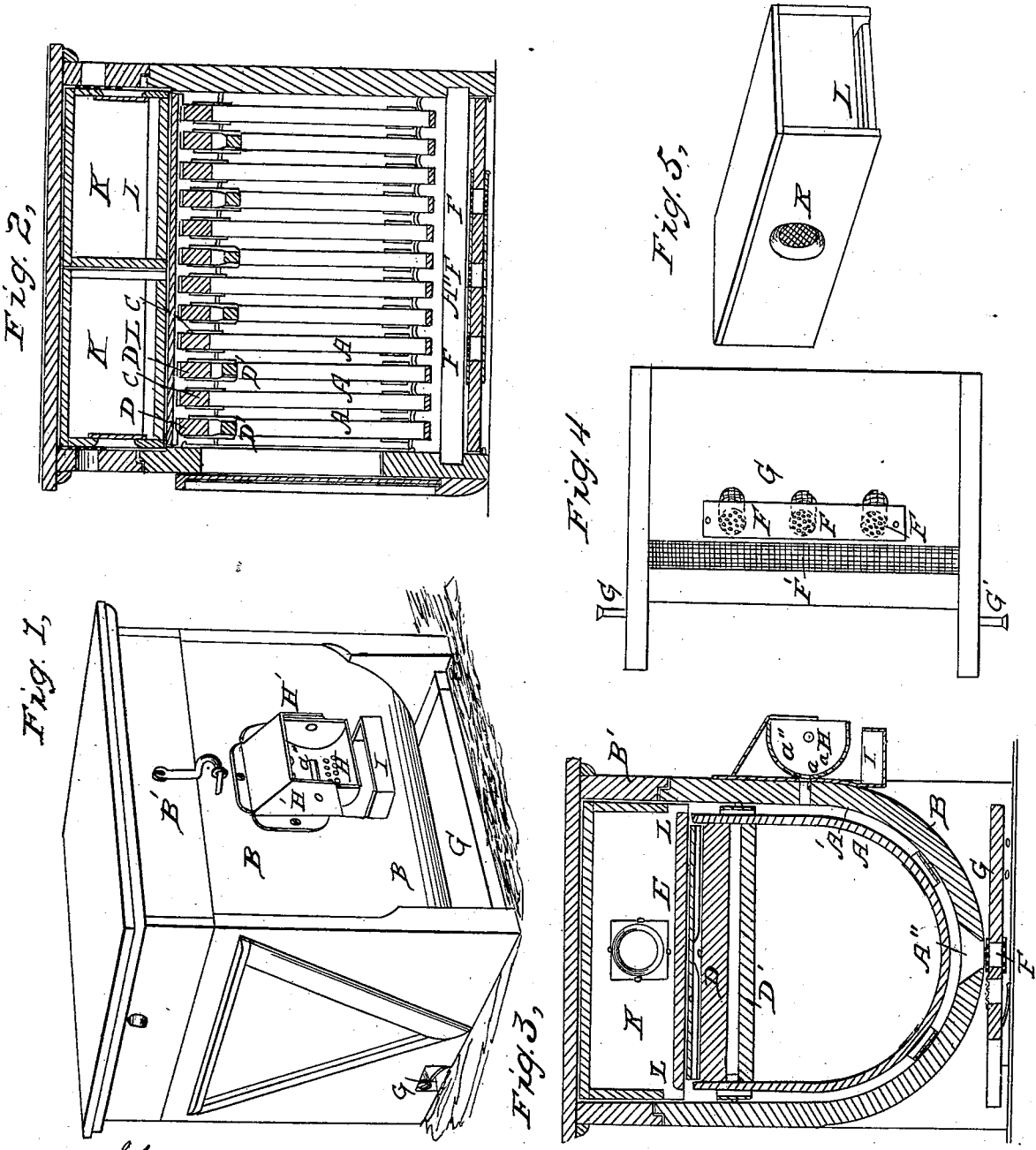

UNITED STATES PATENT OFFICE.

W. A. FLANDERS, OF SHELBY, OHIO.

IMPROVEMENT IN BEE-HIVES.

Specification forming part of Letters Patent No. 39,221, dated July 14, 1863.

*To all whom it may concern:*

Be it known that I, W. A. FLANDERS, of Shelby, in the county of Richland and State of Ohio, have invented new and useful Improvements in Bee-Hives; and I do hereby declare that the following is a full and complete description of the construction and operation of the same, reference being had to the accompanying drawings, making part of this specification, in which—

Figure 1 is a perspective view. Fig. 2 is a longitudinal vertical section. Fig. 3 is a transverse vertical section, and Figs. 4 and 5 are detached parts.

My invention relates, first, to the semicircular comb-frames, in combination with the semicircular case; second, to the arrangement of the comb-frame bars; third, to the construction of the sand-board between the comb-frames; fourth, to the moth-traps, in combination with the adjustable bottom board; fifth, to the adjustable front entrance, and sixth to painting the inside of the case.

A represents the comb-frames. These are formed of semicircular hoops, having their ends fastened together by a bar or bars, C D D'. These frames are inclosed in a semicircular case, B, and when the upper portion of the hive B' is removed can be lifted out at pleasure, whether filled with comb or not. I find from experience that these semicircular comb-frames are superior to the triangular frames described in a former patent, March 6, 1860, granted to me for improvement in bee-hives, for the reason that the triangular frames are too narrow at the bottom to admit of a sufficient quantity of brood comb, and further, that the angle at the bottom affords a place of deposit for the eggs of millers. Neither of these objections present themselves in the semicircular frame. The case B corresponds in form to the frame A, leaving a space, A', between the frame and case for the passage of the bees, over which surface the bees are obliged to travel in reaching the comb-frames, and therefore, by their constant movements, keep the internal surface of the case clean.

In Figs. 2 and 3 are shown sections of the cross-bars C D D', consisting of alternate narrow bars C and wide or double bars D D'. The wide or double bars D D' should drop an inch below the narrow bars C. The object for dropping every alternate bar below those upon either side is to secure a straight comb by compelling the bees to work the comb on the frames in line with the top bar, in order that any of them may be removed, when filled, without injury. Some have placed comb-guides between the comb-frames, but such guides are found objectionable from the obstruction they offer to the passage of the bees, besides being liable to become glued by the bees to the comb.

By dropping every alternate bar, as above described, the comb on the lowest bars are always ahead of the comb on the narrow bars, consequently the lowest combs act as guides for the combs on the upper bars, while the space between the combs on the lower bars is so great that the bees can not cross over with traverse or cross-combs. At the same time the space between the bars serves as a very good winter passage. Next in order is the sand-board E, which is placed directly over the frames A and beneath the honey-boxes in the upper portion of the case B'. This board E is entire, not perforated, and divides the honey-boxes from the frames. The under side is first painted and then sanded, to prevent the bees from sticking it to the bars of the comb-frames, for it is found that the bees will not cement their combs to a sanded surface. Were it not for this dividing sand-board E the bees would work their comb from the bottom of the honey-boxes in such a manner that it would be impossible to remove them without breaking the comb. A space is left along the edges of the board for the passage of the bees, and they enter the honey-boxes K, Figs. 2 and 5, at each end through the opening L. The bees passing up the space A' in the case B are prevented from traveling over the comb, and in thus passing up the sides of the case any dust or fragments of matter are removed and fall to the bottom through the opening A'', thus keeping the passage clear.

G represents an adjustable bottom board. This is placed beneath the case B, as shown in Figs. 1, 2, and 3, and slides back and forth upon the pins G' about two inches, for the object hereinafter stated. To this adjustable bottom board is attached a series of moth-traps, F, arranged in a line beneath the opening A''. These moth-traps F are formed by boring holes through the bottom board, G, and so covering them with perforated metal plates that when placed directly under the opening A″ that the dirt and dust from the inner surface of the case B will pass through into the cavity beneath. Beneath them I place a tin plate, upon which this dirt and dust is collected. In the evening, when the millers visit the hives for the purpose of depositing their eggs, hearing the bees above, they pass through the opening into the trap and deposit their eggs in the accumulated matter which rests upon the tin plate, and, being prevented from passing upward into the hive, take their departure by the way they entered, and on the following day the wind blows away the dust and eggs together. The space A″ serves for a general entrance for the bees during the working season, which in winter may be closed by drawing the bottom board forward so that the wire-gauze F′ is brought directly under the entrance A″, which, while it prevents the escape of the bees in the pleasant days of spring, allows of free ventilation during the winter season.

In addition to the main entrance before described, I place one upon the side (shown at H, Figs. 1 and 3,) the design of which is to close the hive either with or without ventilation, and also to prevent robbing, and to which is also attached a moth-box. This device consists of a semicircular door, H, which turns upon the pivots H′. This door is provided with entrances a a a for the bees, which are set opposite to the aperture in the case seen at a′, and when in this position the lower wing of the door is directly above the moth-box I, which is made of tin plate and into which falls the matter carried from the hive. Salt may be placed in this for the use of the bees. During the moth season the millers will here deposit their eggs, instead of entering the hives. A wire-screen, a″, in the door can be adjusted so as to close the entrance and allow ventilation, or by turning a little further close the entrance wholly. The inside of the case B is painted for the purpose of cleanliness and preventing the absorption of moisture by the wood.

What I claim as my improvement, and desire to secure by Letters Patent, is—

1. The semicircular comb frames A, in combination with a semicircular case, B, arranged as and for the purpose specified 2. The sand-board E, which forms a partition between the comb-frames and honey-boxes above, constructed as and for the purposes set forth.

3. The moth-traps F, in combination with the adjustable bottom board, G, arranged and operating in the manner and for the object described.

4. The adjustable front entrance, H, in combination with the moth-box I, arranged and operating as specified.

W. A. FLANDERS.

Witnesses:
S. S. BLOOM.
WM. OWINGS.